US011867581B1

(12) United States Patent
Bhalsod et al.

(10) Patent No.: US 11,867,581 B1
(45) Date of Patent: Jan. 9, 2024

(54) METHODS AND SYSTEMS FOR MODELING TRAPPED AIR IN HONEYCOMB BASED CRASH BARRIERS

(71) Applicant: ANSYS, Inc., Canonsburg, PA (US)

(72) Inventors: Dilip Bhalsod, Troy, MI (US); Julien Santini, Troy, MI (US); Raghavendra Chivukula, Troy, MI (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 17/182,459

(22) Filed: Feb. 23, 2021

Related U.S. Application Data

(60) Provisional application No. 63/113,036, filed on Nov. 12, 2020.

(51) Int. Cl.
*G01L 5/00* (2006.01)
*G01M 7/08* (2006.01)
*G01M 17/007* (2006.01)

(52) U.S. Cl.
CPC ............ *G01L 5/0052* (2013.01); *G01M 7/08* (2013.01); *G01M 17/0078* (2013.01)

(58) Field of Classification Search
CPC .... G01L 5/0052; G01M 7/08; G01M 17/0078
See application file for complete search history.

(56) References Cited

U.S. PATENT DOCUMENTS

| 6,004,066 | A  | * | 12/1999 | Niemerski | ............ | E01F 15/145 |
|           |    |   |         |           |              | 404/6       |
| 8,359,857 | B2 | * | 1/2013  | Ingersoll | ................ | F03D 9/257  |
|           |    |   |         |           |              | 60/512      |
| 10,452,795 | B2 | * | 10/2019 | Roberts | .................... | G06F 30/23 |
| 2004/0169398 | A1 | * | 9/2004 | Browne | .................. | F16F 7/121 |
|           |    |   |         |           |              | 296/187.03 |
| 2011/0130111 | A1 | * | 6/2011 | Crandall | ........... | B60R 21/01526 |
|           |    |   |         |           |              | 455/404.1  |

FOREIGN PATENT DOCUMENTS

| CN | 110287641 A | * | 9/2019 | |
| WO | WO-2009043587 A1 | * | 4/2009 | ......... G06F 17/5018 |

OTHER PUBLICATIONS

Machine translation of CN110287641A (Year: 2019).*
R. K. McFarland, Jr. "The Development of Metal Honeycomb Energy-Absorbing Elements", Technical Report No. 32-639, Jul. 24, 1964, Jet Propulsion Laboratory, California Institute of Technology, Pasadena, California.

* cited by examiner

*Primary Examiner* — Alesa Allgood
*Assistant Examiner* — Sangkyung Lee
(74) *Attorney, Agent, or Firm* — Womble Bond Dickinson (US) LLP

(57) ABSTRACT

A specification of a honeycomb based crash barrier including a cell is received in a computer system. The cell contains trapped air. A model representing the honeycomb based crash barrier is generated. The trapped air in the cell is represented as a compressible element, which is characterized by a force-deflection relationship between an air pressure in the cell and a crush-distance of a compression of the cell. Physical behaviors of the honeycomb based crash barrier are simulated using the model. The physical behaviors include numerical behaviors of the trapped air based on the force-deflection relationship.

19 Claims, 17 Drawing Sheets

830

832 — Receive a specification of a honeycomb based crash barrier including a cell, the cell contains trapped air 834 — Generate a model representing the honeycomb based crash barrier, the trapped air in the cell is represented as a compressible element characterized by a force-deflection relationship between an air pressure in the cell and a crush-distance of a compression of the cell 838 — Simulate physical behaviors of the honeycomb based crash barrier using the model, the physical behaviors include numerical behaviors of the trapped air based on the force-deflection relationship

*FIG. 8C*

METHODS AND SYSTEMS FOR MODELING TRAPPED AIR IN HONEYCOMB BASED CRASH BARRIERS

CROSS-REFERENCE TO RELATED APPLICATIONS

This application claims benefits of U.S. Provisional Patent Application Ser. No. 63/113,036 for "METHODS AND SYSTEMS FOR MODELING TRAPPED AIR IN HONEYCOMB CRASH BARRIERS", filed Nov. 12, 2020. The contents of which are hereby incorporated by reference in its entirety for all purposes.

FIELD

The subject matter described herein relates to computer-aided engineering analysis (CAE), more particularly to methods and systems for simulating effects due to trapped air in honeycomb based crash barriers.

BACKGROUND

Automotive manufacturers need to design motor vehicles that meet government requirements/standards. One of the requirements is to pass a series of car crash/impact tests such that human occupants can survive certain impact events. A car crash/impact test is a form of destructive testing usually performed in order to ensure safe design standards in crashworthiness and crash compatibility for various modes of transportation (see automobile safety) or related systems and components. Some impact tests involve other vehicles (e.g., side impact by another car). National Highway Traffic Safety Administration (NHTSA) provides standard specifications of crash barriers to represent the other vehicles in such impact tests.

Based on aluminum honeycomb technology, the National Highway Traffic Safety Administration (NHTSA) crash barrier is designed to be used in various impact events. The crash barrier is a precision measurement tool to ensure repetitive and correlative results under similar test conditions and to reflect adequately the protective performance of a motor vehicle or item of motor vehicle equipment with respect to human occupants.

Aluminum honeycomb based crash barriers are designed to represent static and dynamic structural strength of a motor vehicle including, for example, compact car, mid-sized car, full-sized car, truck, etc. However, physical car crash/impact tests are very expensive and difficult to conduct. Automotive industry has been using computer to conduct car crash simulations to reduce the number of physical crash/impact tests including, but not limited to, collision with honeycomb based crash barriers.

A car crash simulation is a virtual recreation of a destructive crash/impact test of a car using a computer simulation in order to examine the level of safety of the car and its occupants. Car crash simulations are used by automakers during computer-aided engineering (CAE) analysis for crashworthiness in the computer-aided design (CAD) process of modelling new cars. During a car crash simulation, the kinetic energy, or energy of motion, that a vehicle has before the impact is transformed into deformation energy, mostly by plastic deformation (plasticity) of the car body material (i.e., Body in White), at the end of the impact. Honeycomb based crash barriers are used for representing such characteristics for a typical car.

To properly simulate physical behaviors of a honeycomb based crash barriers needs to include both static and dynamic effects. Static effects are based on static crush strength in a standard specification of a honeycomb based crash barrier. Dynamic effects include crush resistance due to trapped air in each cell of a honeycomb based crash barrier.

Prior art approaches in simulating effects due to trapped air have been inadequate and cumbersome. For example, an artificial non-physical tuning effort must be performed for each of the several standard benchmark tests. Different tuning factors are required for each and every simulation thereby causing difficulties and/or inaccuracies due to arbitrary orientations of impact events.

SUMMARY

The disclosure describes methods and systems for modeling trapped air in honeycomb based crash barriers for dynamic responses. In one aspect, a specification of a honeycomb based crash barrier including a cell is received in a computer system. The cell contains trapped air. A model representing the honeycomb based crash barrier is generated. The trapped air in the cell is represented as a compressible element, which is characterized by a force-deflection relationship between an air pressure in the cell and a crush-distance of a compression of the cell. Physical behaviors of the honeycomb based crash barrier can be simulated using the model. The physical behaviors include numerical behaviors of the trapped air based on the force-deflection relationship.

Terms "honeycomb based crash barrier" and "crash barrier" are used interchangeably throughout this document.

In another aspect, a honeycomb based crash barrier contains multiple cells. Each cell contains an elongated member with trapped air contained therein. Each cell a hollow hexagonal cross-section. Together, the cross-section of the multiple cells resembles a honeycomb. Static structural strength characteristics of a honeycomb based crash barrier are specified by suppliers regulated under NHTSA. A mesh model (e.g., a finite element analysis model) is created to represent a honeycomb based crash barrier using two-dimensional shell finite elements. The specified target static structural strength characteristics of the crash barrier can be matched in a series of static crush simulations.

An air pressure versus crush-distance relationship of a single cell in a honeycomb based crash barrier can be obtained in a simulation of a compression of the single cell. The air pressure versus crush-distance relationship can be converted to a force-deflection relationship of a one-dimensional element (i.e., discrete beam element). The mesh model can be modified to include such a one-dimensional element for each cell. Each one-dimensional element is associated with the force-deflection relationship. Physical behaviors of a honeycomb based crash barrier can be simulated using the modified mesh model. The physical behaviors include effects due to the trapped air based on the force-deflection relationship.

DESCRIPTION OF DRAWINGS

These and other features, aspects, and advantages of the disclosure will be better understood with regards to the following description, appended claims, and accompanying drawings as follows:

FIG. 8C is a flowchart illustrating an alternative example computer-implemented process of modeling trapped air in a honeycomb based crash barrier;

DETAILED DESCRIPTION

Systems and methods for simulating effects due to trapped air in honeycomb based crash barriers are disclosed. A honeycomb based crash barrier contains multiple elongated members (multiple cells) made of aluminum. Each member (single cell) has a hollow hexagonal cross-section with trapped air contained therein. Together, the cross-section of elongated members (multiple cells) of the crash barrier resembles a honeycomb. Static structural strength characteristics of a honeycomb based crash barrier are specified by suppliers regulated under NHTSA. A mesh model (e.g., a finite element analysis model) is created to represent a honeycomb based crash barrier using two-dimensional shell finite elements. The specified target static structural strength characteristics of the crash barrier can be matched in a series of static crush simulations.

Air pressure of the trapped air versus crush-distance relationship of a single cell in a honeycomb based crash barrier can be obtained is a simulation of a compression of the single cell based on a control volume. The pressure versus crush-distance relationship can be converted to a force-deflection relationship of a one-dimensional element (e.g., discrete beam element). The mesh model can be modified to include such a one-dimensional element for each cell in the honeycomb based crash barrier. Each one-dimensional element is associated with the force-deflection relationship. Physical behaviors of a honeycomb based crash barrier can then be obtained in a simulation using the modified mesh model. The physical behaviors include numerical behaviors of the trapped air based on the force-deflection relationship.

Figure 1A:
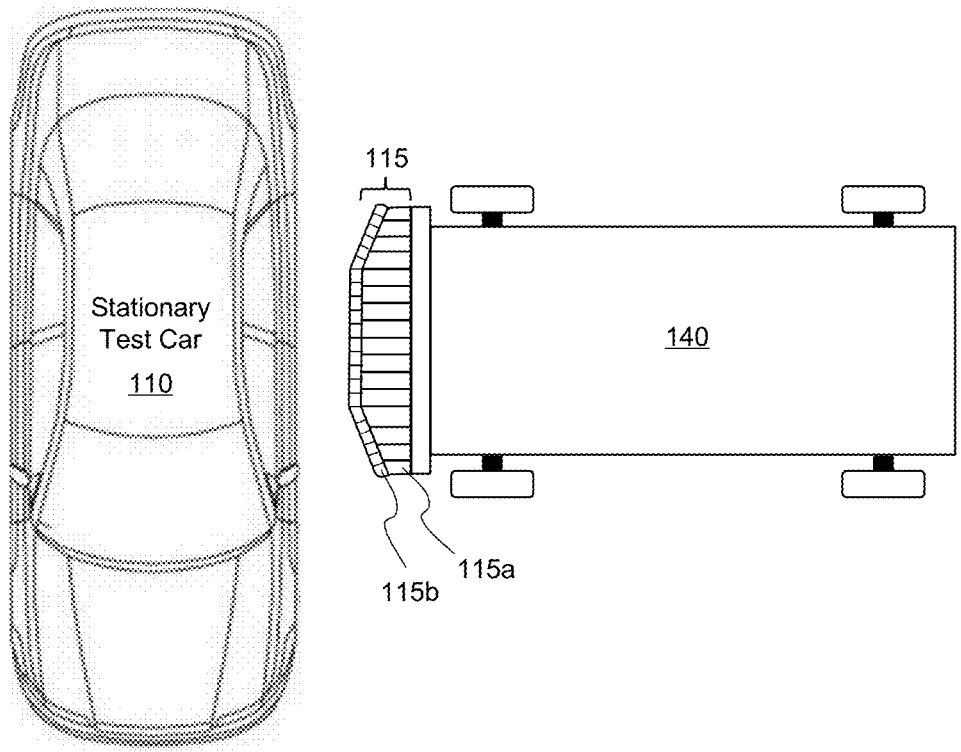
FIG. 1A is a diagram depicting a side impact event between an example honeycomb based crash barrier and a stationary test vehicle.

FIG. 1A is a diagram depicting a side impact event between an example honeycomb based crash barrier 115 mounted in front of a mobile carriage 140 and a stationary test vehicle 110.

Figure 1B:
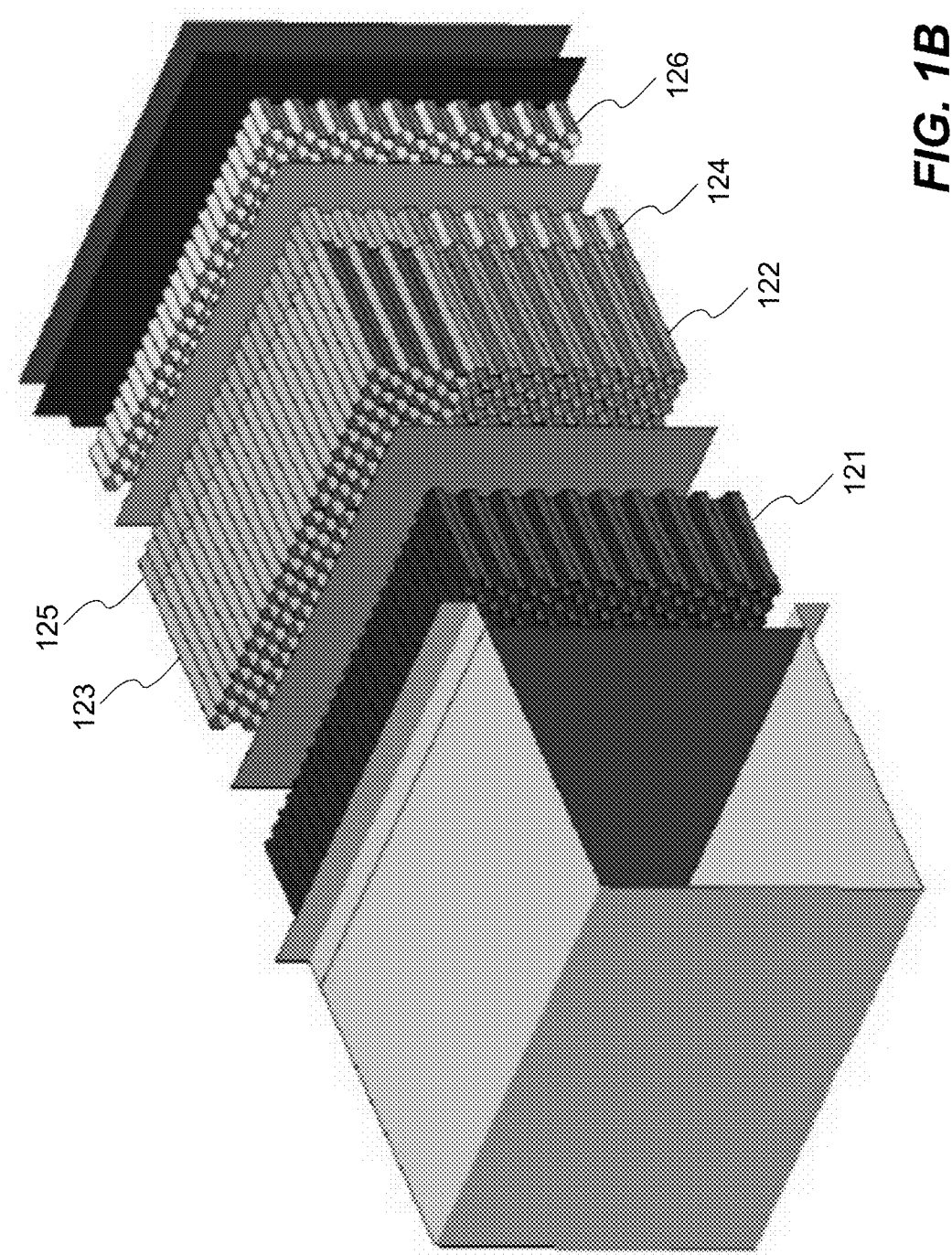
FIG. 1B is an exploded perspective view illustrating an example honeycomb based crash barrier.

Honeycomb based crash barrier 115 contains two major portions: main block 115a and bumper element 115b. Each crash barrier can contain more than one honeycomb sections arbitrarily orientated (e.g., stacked back-to-back, and/or located parallel to one another). An exploded perspective view 120 showing an example honeycomb based crash barrier in FIG. 1B. Several layers and/or groups of elongated members (multiple cells) 121-126 are in this example.

Figure 1C:
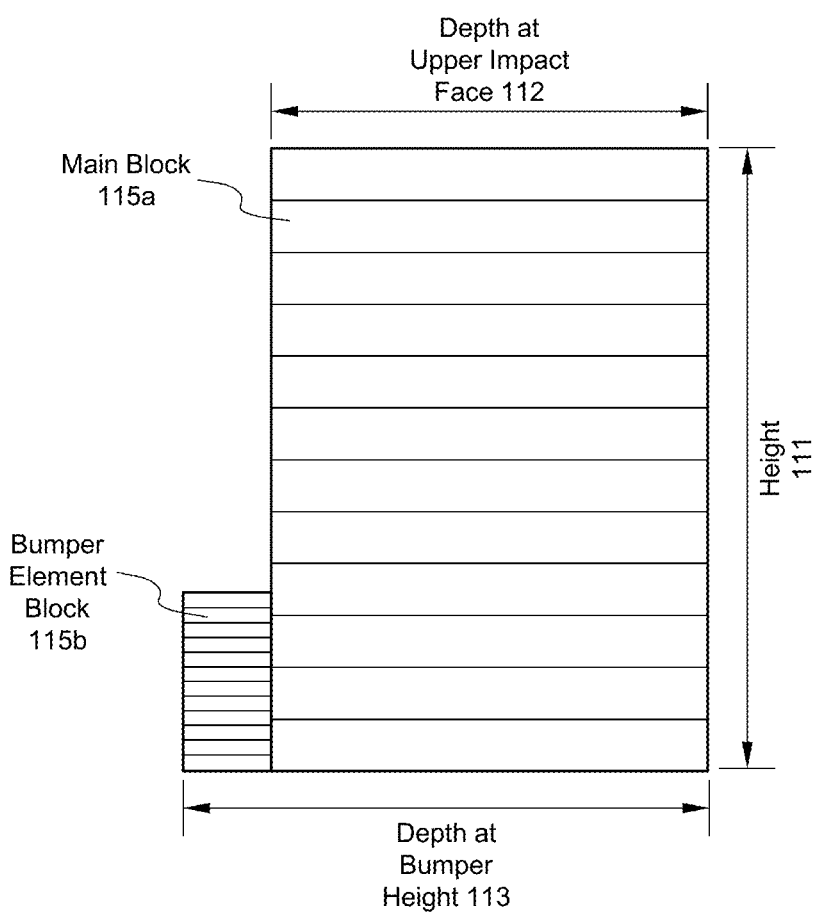
FIG. 1C is an elevation view showing a cross-section of an example honeycomb based crash barrier.

An elevation view of the honeycomb based crash barrier is shown in FIG. 1C. Within the main block 115a and the bumper element block 115b, there are many elongated members (multiple cells) made of aluminum. Each member (single cell) has a hollow hexagonal cross-section. The cell sizes are generally different for the main block 115a and for the bumper element block 115b. For example, the cell size for the main block 115a is 19.1 mm while the cell size for the bumper element block is 6.4 mm. Other terms used in a specification of honeycomb based crash barrier can be the height 111, the depth at upper impact face 112, and the depth at the bumper height 113.

Figure 2A:
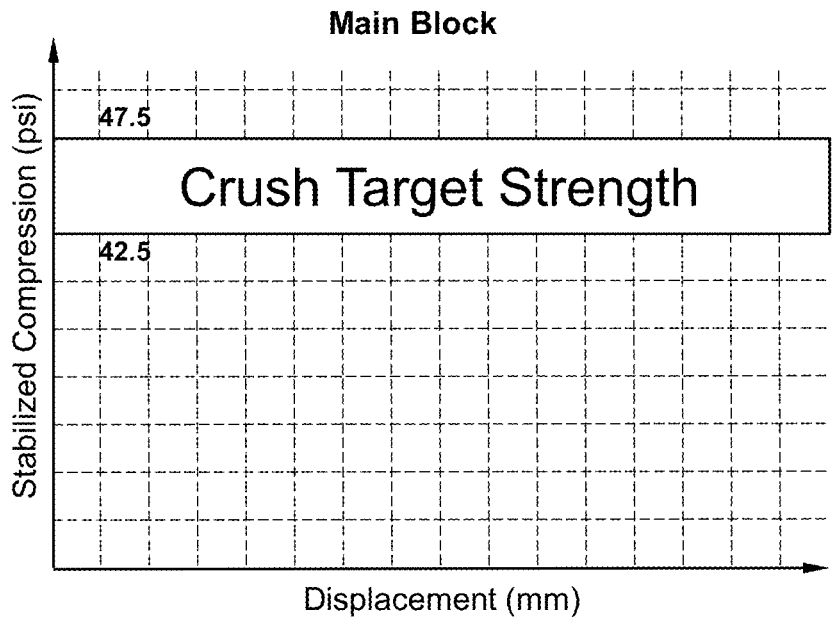
FIGS. 2A-2B are diagrams showing specified static crush strength of an example honeycomb based crash barrier.
Figure 2B:
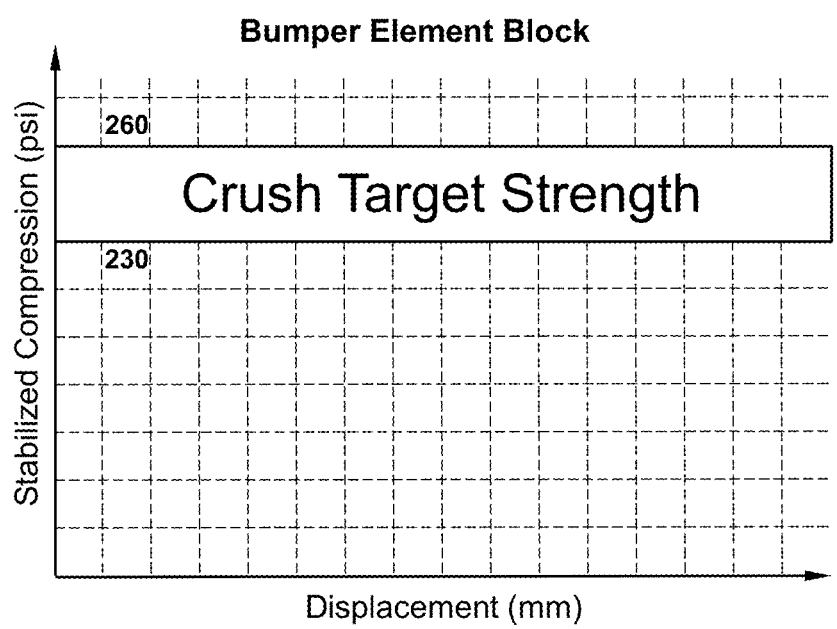

Manufacturers of honeycomb based crash barriers issue a specification of a particular crash barrier they provided. An example is shown in FIGS. 2A-2B. The static crush strength of an example honeycomb based crash barrier (AFL NHTSA FMVSS 214 side impact crash barrier) contains two parts: crush target strength of 45+/−2.5 psi (i.e., 42.5-47.5 psi) for the main block, and 245+/−15 psi (i.e., 230-260 psi) for the bumper element block.

An example specification for a honeycomb based crash barrier is listed as follows: The total quantity of kinetic energy to be absorbed by the AFL NHTSA FMVSS 214 side impact crash barrier is between 124,000 and 138,000 Joules.

Figure 3A:
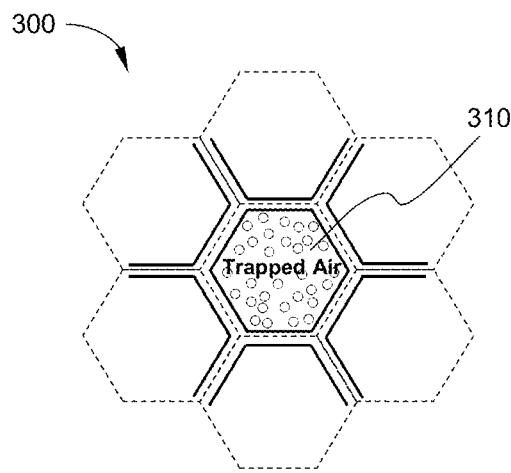
FIG. 3A is a diagram illustrating a honeycomb cross-section of an example honeycomb based crash barrier with trapped air enclosed therein.

The AFL barrier dimensions are:
  Width=1676+/−6 mm
  Height=559+/−6 mm (e.g., height 111 in FIG. 1C)
  Depth at bumper height=483+/−6 mm (e.g., depth 113 in FIG. 1C)
  Depth at upper impact face=381+/−6 mm (e.g., depth 112 in FIG. 1C)
Main Honeycomb Block
  Alloy 3003
  Cell Size 19.1 mm
Bumper Element Block
  Alloy 3003
  Cell Size 6.4 mm
Backing Sheet
  Aluminum 5052 H4
  T 0.8 mm
Cladding Sheet
  Aluminum 5052 H4
  T 0.8 mm Bumper Facing Sheet
  Aluminum 2024 T3
    T 0.3 mm
  Adhesive
    Two-part polyurethane/resin with hardener A cross-section diagram 300 showing the honeycomb shape of the elongated members (multiple cells) of an example honeycomb based crash barrier is in FIG. 3A. Each cell 310 has a hollow hexagonal cross-section with trapped air contained therein.

Figure 3B:
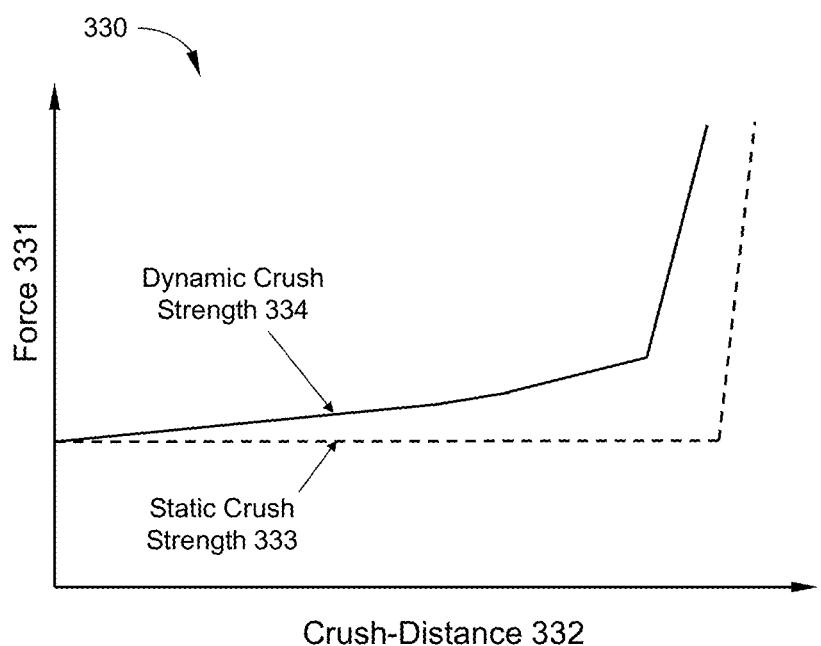
FIG. 3B is a diagram illustrating static and dynamic characteristics of an example honeycomb based crash barrier.

FIG. 3B is a diagram illustrating static and dynamic crush strength of an example honeycomb based crash barrier. The diagram 330 is a force 331 versus crush-distance 332 plot. The static strength 333 mains a constant force (i.e., flat portion) in the crash barrier until the crash barrier has been crushed down to a pile of materials, the force becomes infinitely large. The dynamic strength 334 includes effects due to trapped air, which is generally higher than the static strength. The force in the crash barrier moves up as the crash barrier being crushed until nothing left. Then the force becomes infinitely large.

Figure 4:
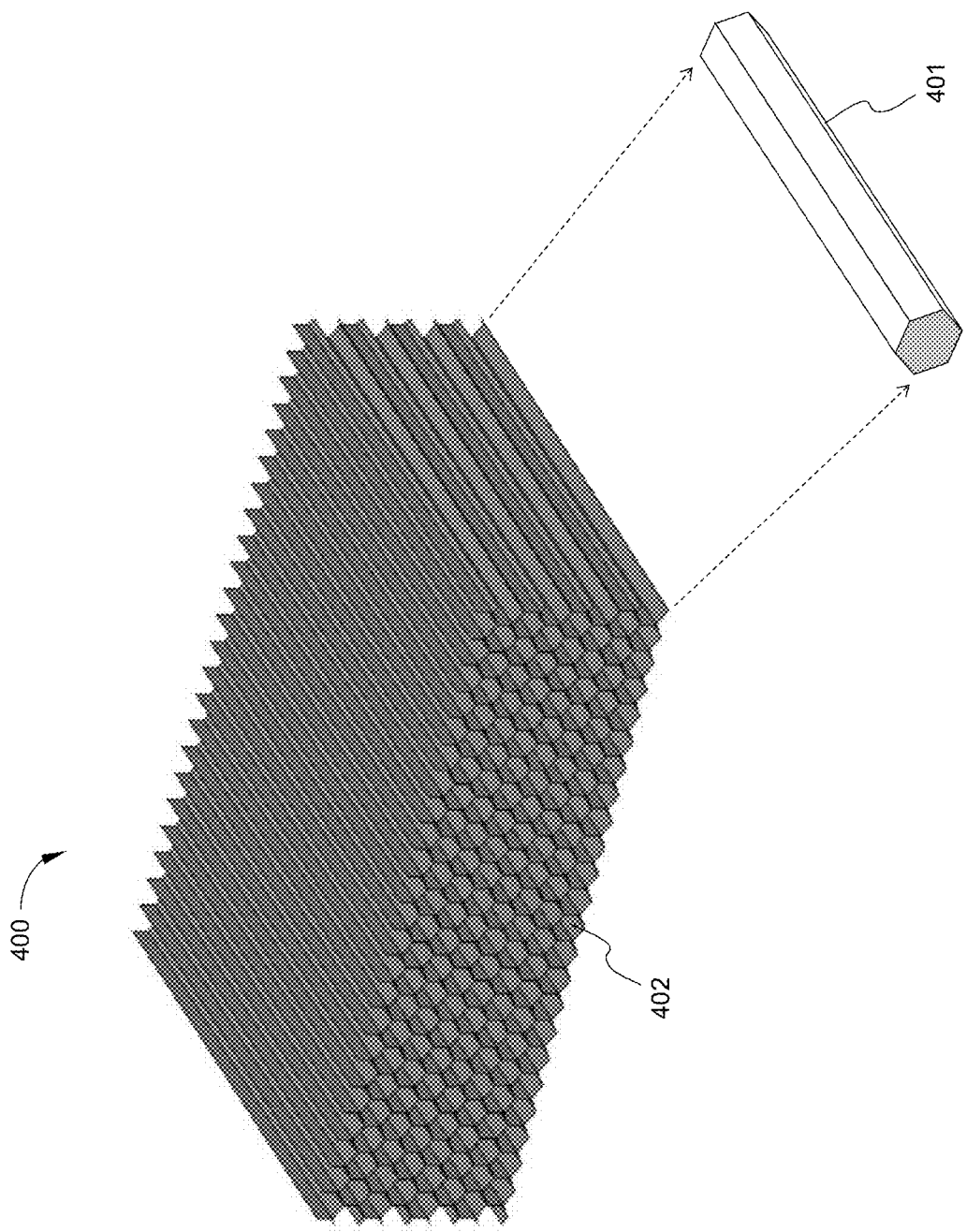
FIG. 4 is a diagram showing a mesh model representing static strength of an example honeycomb based crash barrier.

FIG. 4 is a diagram showing an example mesh model 400 for a honeycomb based crash barrier having multiple cells 402. The mesh model 400 represents the static structure strength with two-dimensional shell finite elements to model the structure of the multiple cells 402. Each cell 401 is an elongated member with a hollow hexagonal cross-section. The mesh model 400 is for modeling the static crush strength of a honeycomb based crash barrier.

Figure 5A:
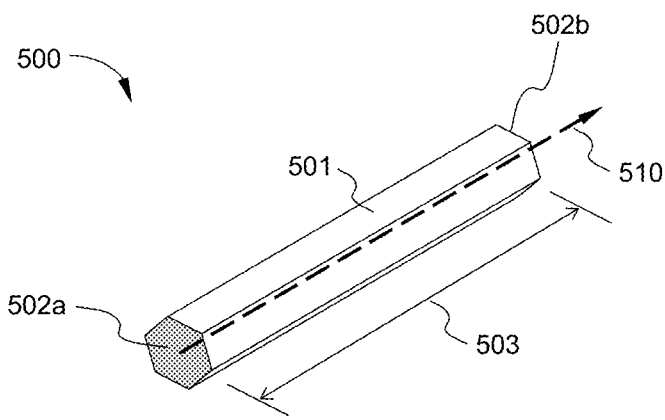
FIGS. 5A-5B are diagrams showing an example airbag model used in a simulation of a compression of a single cell for determining numerical behaviors of trapped air in the single cell.

To determine effects due to trapped air in a honeycomb based crash barrier, a simulation of a compression of a single cell (e.g., cell 401) is conducted. In one embodiment, an airbag model 500 shown in FIG. 5A is used in the simulation to determine numerical behaviors of the trapped air.

Control volume is a volume in space of special interest for particular analysis. The surface of the control volume is referred as a control surface and is a closed surface. The airbag model 500 based on control volume has a volume of a single cell formed by eight two-dimensional surfaces—two ends and six sides. The single cell includes an elongated member having a uniform hexagonal cross-section with two identical hexagon ends. The airbag model 500 is initially modeled with the geometry of the single cell with two ends 502a-502b. A longitudinal axis 510 is defined as an axis connecting respective centers of the ends 502a-502b. The direction of the longitudinal axis 510 can be defined from the first end 502a to the second end 502b. Each of the six sides 501 of the elongated member has a rectangular shape with a length 503 along the longitudinal axis 510.

Figure 5B:
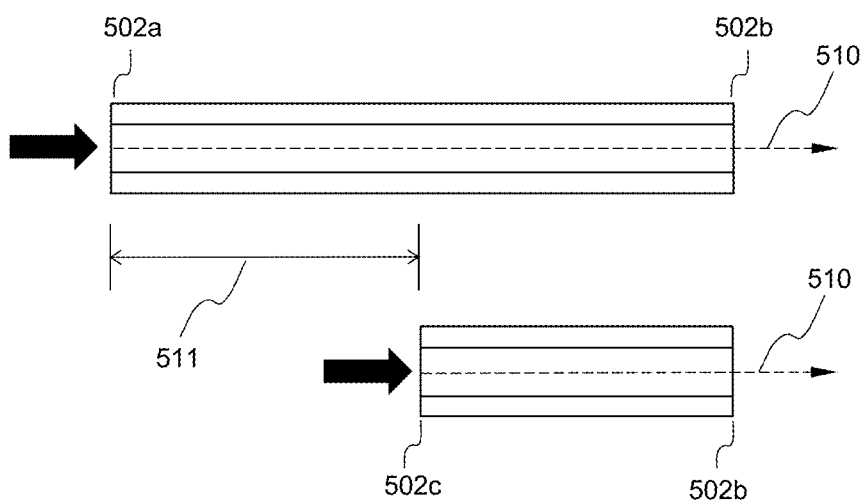

The direction of the longitudinal axis 510 is the crush or compression direction used in a simulation shown in FIG. 5B. Trapped air inside the cell is compressed as the airbag model 500 is crushed or pushed or compressed from the first end 502a towards the second end 502b. The first end 502a is treated as a moving boundary—moving towards the second end 502b, which is a fixed boundary. Crush-distance 511 is the distance between the initial location of the first end 502a and the current location of the first end 502c. In other words, crush-distance is the distance that the moving boundary has moved in the simulation.

Additionally, the cell has substantially uniformly shaped cross-sections. For example, the airbag model 500 representing the trapped air in the cell maintains the same hexagonal cross-section throughout the simulation, because the trapped air in the intact portion of a cell are in the original hexagonal cross-section of the cell. In a crash simulation involved a honeycomb based crash barrier, each cell in the crash barrier is crushed or pushed or compressed from the first end 502a to the second end 502b. During the simulation, the intact portion of a cell between the current location of the first end 502c and the second end 502b maintains the same hexagonal cross-section.

The pressure of the airbag model 500 increases nonlinearly as the simulation carries on (i.e., the crush-distance increases). Finite elements representing the sides of the airbag model 500 provide a shape (i.e., maintaining hexagonal cross-section during the simulation) not structural strength. In one embodiment, finite elements associated with "NULL" material type can be used. Finite elements using "NULL" material do not generate any internal load. Finite elements for the six sides are used to define the shape and location of control surfaces only.

Control Volume

The position, orientation, and current surface area of the control surface elements are computed and stored at each time step, these properties of the control surface elements are used to calculate the control volume, i.e., the airbag volume. The area of the control surface can be related to the control volume through Green's Theorem.

$$\iiint \phi \frac{\partial \psi}{\partial x} dxdydz = -\iiint \psi \frac{\partial \phi}{\partial x} dxdydz + \oint \phi\psi n_x d\Gamma \quad (1)$$

where the first two integrals are integrals over a closed volume, i.e., dv=dxdydz, the last integral is an integral over the surface di enclosing the volume, and $n_x$ is the direction cosine between the surface normal vector and the x-direction (corresponding to the x-partial derivative); similar forms can be written for the other two directions (i.e., y- and z-directions). Two arbitrary functions $\phi$ and $\psi$ need only be integrated over the volume and surface.

The integral form of the volume can be written as:

$$V=\iiint dxdydz \quad (2)$$

Comparing the volume integrals in Equation (1) to Equation (2), it can easily obtain the volume integral from Equation (1) by choosing for two arbitrary functions below for the x direction:

$$\phi=1 \quad (3)$$

$$\psi=x \quad (4)$$

Leading to $$V=\iiint dxdydz= \oint xn_x d\Gamma \quad (5)$$

The surface integral in Equation (5) can be approximated by a summation over all the elements comprising the airbag, i.e., $$\oint xn_x d\Gamma \approx \sum_{i=1}^{N} x_i n_{ix} A_i \quad (6)$$

where for element i:
  $x_i$ is the average coordinate in the x direction;
  $n_{ix}$ is the direction cosine between the element's normal direction and the x direction; and
  $A_i$ is the surface area of element i.

Equation of State Model

At each time step, the current volume of airbag is determined from the control volume calculation. The pressure in the airbag corresponding to the control volume is determined from an equation of state (EOS) that relates the pressure to the current gas density and the specific internal energy of the gas. The equation of state used for the airbag simulations is governed by Gamma law.

$$p=(k-1)\rho e \quad (7)$$

where:
p is the pressure,
k is a constant,
p is the density, and
e is the specific internal energy of the gas.

The derivation of this equation of state is obtained from thermodynamic considerations of the adiabatic expansion of an ideal gas. The incremental change in internal energy, dU, in n moles of an ideal gas due to an incremental increase in temperature, dT, at constant volume is given by:

$$dU=nc_v dT \quad (8)$$

where $c_v$ is the specific heat for constant volume.

Using the ideal gas law, the change in temperature, T, to a change in the pressure, p, and total volume, v, is as follows:

$$d(pv)=nRdT \quad (9)$$

where R is the universal gas constant.

Solving Equation (9) for dT and substituting the result into Equation (8) gives $$dU=c_v d(pv)/R=d(pv)/(k-1) \quad (10)$$

$$R=c_p-c_v \quad (11)$$

$$k=c_p/c_v \quad (12)$$

Equation (10) can be rewritten as $$dU = \frac{\rho_0 v_0}{(k-1)} d\left(\frac{p}{\rho}\right) \quad (13)$$

$$e = U/(\rho_0 v_0) = \frac{p}{\rho(k-1)} \quad (14)$$

Solving for the pressure to obtain equation of state as follows:

$$p=(k-1)\rho e \quad (15)$$

The equation of state and the control volume calculations can only be used to determine the pressure when the specific internal energy is known. The internal energy can be obtained by assuming the change in internal energy given by $$dU=-pdv \quad (16)$$

where the minus sign is introduced to emphasize that the volume increment is negative when the gas is being compressed.

This expression can be written in terms of the specific internal energy as $$de=dU/(\rho_0 v_0)=-pdv/(\rho_0 v_0) \quad (17)$$

Dividing Equation (17) by Equation (15) to obtain $$\frac{de}{e} = \frac{(k-1)\rho dv}{\rho_0 v_0} = -\frac{(k-1)dv}{v} \quad (18)$$

which yields to $$\ln(e)=(1-k)\ln V \quad (19)$$

or evaluating at two states and exponentiating both sides yields the specific internal energy evolution equation:

$$e_2 = e_1\left(\frac{v_2}{v_1}\right)^{(1-k)} \quad (20)$$

Based on Equations (20) and (15), the control volume calculations define the pressure-volume relationship in an airbag model.

A relative change of the internal energy of the trapped air is related to a relative change of a volume of the trapped air. A change of the volume of the trapped air corresponds to the amount of the compression of the cell. The pressure of the trapped air increases nonlinearly with the amount of the compression of the cell according to the related relative changes of the internal energy and the volume of the trapped air in the simulation of the compressing of the cell.

Figure 5C:
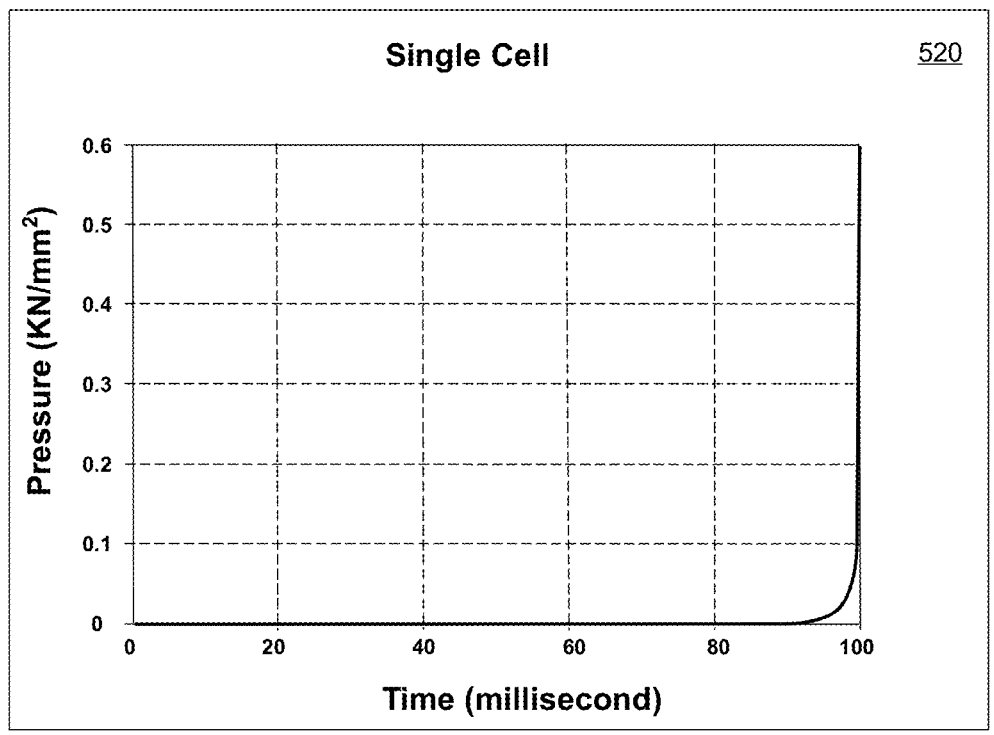
FIG. 5C is a diagram showing an example air pressure time history in a single cell.

The simulation result is shown in FIG. 5C as a pressure time history plot 520 of the single cell. The pressure is the air pressure of the trapped air, as the airbag model 500 is compressed in the simulation. In the span about 100 milliseconds (ms), the pressure inside the airbag model builds up nonlinearly at the end (around 90-100 ms). The simulated results (i.e., the pressure time history of the trapped air inside a single cell) are converted to a pressure versus crush-distance relationship 540 shown in FIG. 5D. Crush-distance is related to the simulation time. Next, the pressure versus crush-distance relationship 540 can be converted to an axial force versus crush-distance relationship 550 by multiplying the pressure with the cross-section area (i.e., area of the hexagonal cross-section) of a single cell. The force versus crush-distance relationship 550 in a single cell 510 can be used as a force-deflection relationship associated with a one-dimensional element or compressible element. The force-deflection relationship is between the axial force due to air pressure in the cell versus the crush-distance of the compression in the simulation. Numerical behaviors of trapped air in a single cell are based on the force-deflection relationship. To include the trapped air in a model of a honeycomb based crash barrier, each of the multiple cells can be represented by a one-dimensional element specified with a force-deflection relationship. In one embodiment, the force-deflection relationship is implemented as a lookup table containing two sets of numerical values to correlate force and deflection.

Lookup table contains an array or matrix of data that contains items that are searched. Lookup tables may be arranged as key-value pairs, where the keys are the data items being searched (looked up) and the values are the actual data.

An example of the one-dimensional element or compressible element is a discrete beam element, which allows the user to define numerical behaviors (e.g., numerical behaviors of the trapped air). Such a discrete beam element permits elastic and elastoplastic springs with damping to be represented by using six springs each acting about one of the six local degrees-of-freedom. For elastic behaviors, a load curve (i.e., force-deflection relationship) defines force or moment as a function of displacement or rotation. For inelastic behaviors, a force-deflection relationship defines yield force or moment as a function of plastic deflection or rotation, which can vary in tension and compression. One dimensional element (i.e., discrete beam element) for representing trapped air whose numerical behaviors are based on the force-deflection relationship. The force-deflection relationship corresponds the axial force (i.e., air pressure increases due to a compression of a single cell in the simulation) versus the deflection (i.e., the corresponding crush-distance of the compression).

Figure 6:
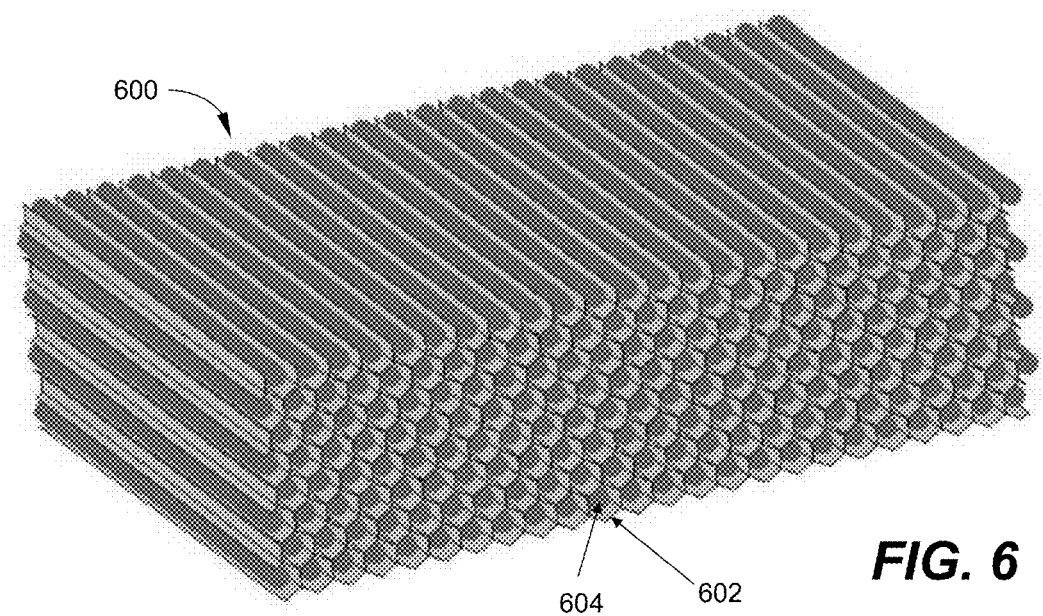
FIG. 6 is a diagram showing a model of an example honeycomb based crash barrier representing both static and dynamic strengths.

FIG. 6 shows a mesh model 600 for representing both static strength and dynamic strength of an example honeycomb based crash barrier. The model 600 is modified from the mesh model 400. The model 600 represents multiple cells of the honeycomb based crash barrier. Each cell is modeled with shell finite elements 602 representing static strength and a one-dimensional element 604 representing the trapped air contained therein. Each one-dimensional element is associated with a force-deflection relationship that characterizes numerical behaviors of the trapped air in a single cell.

Figure 7:
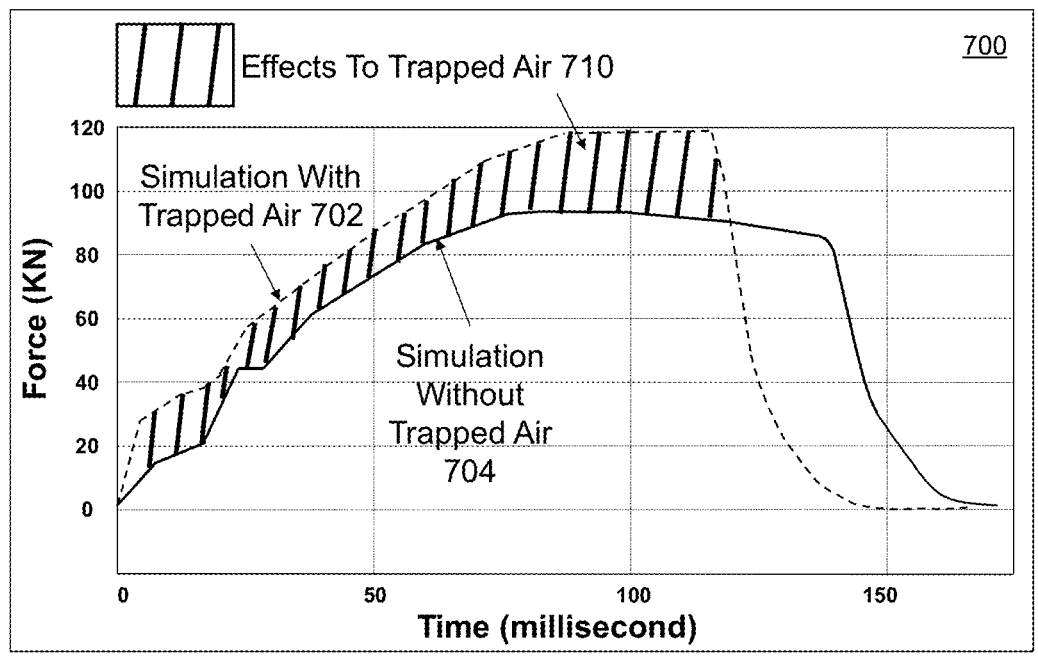
FIG. 7 is a diagram showing effects due to trapped air in an example honeycomb based crash barrier.

The results (i.e., force time history 700) of two simulations are shown in FIG. 7, which show a comparison between simulation results with trapped air 702 and without trapped air 704. The shaded area 710 is the effects due to the trapped air. For example, two simulations may be conducted using the model 600 and the mesh model 400 for including the trapped air and not including the trapped air, respectively.

Figure 8A:
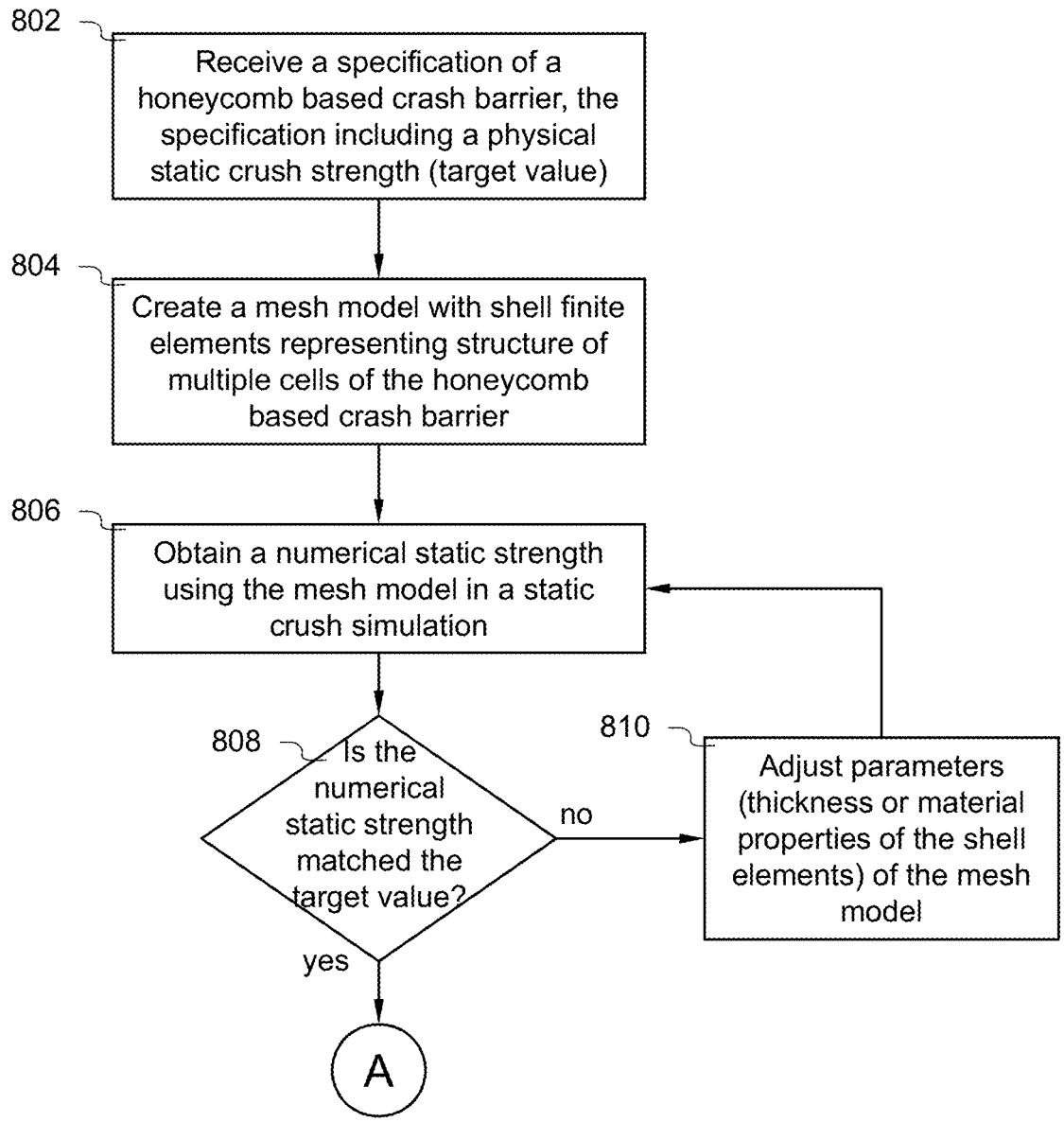
FIGS. 8A-8B collectively is a flowchart illustrating an example computer-implemented process of modeling trapped air in a honeycomb based crash barrier.
Figure 8B:
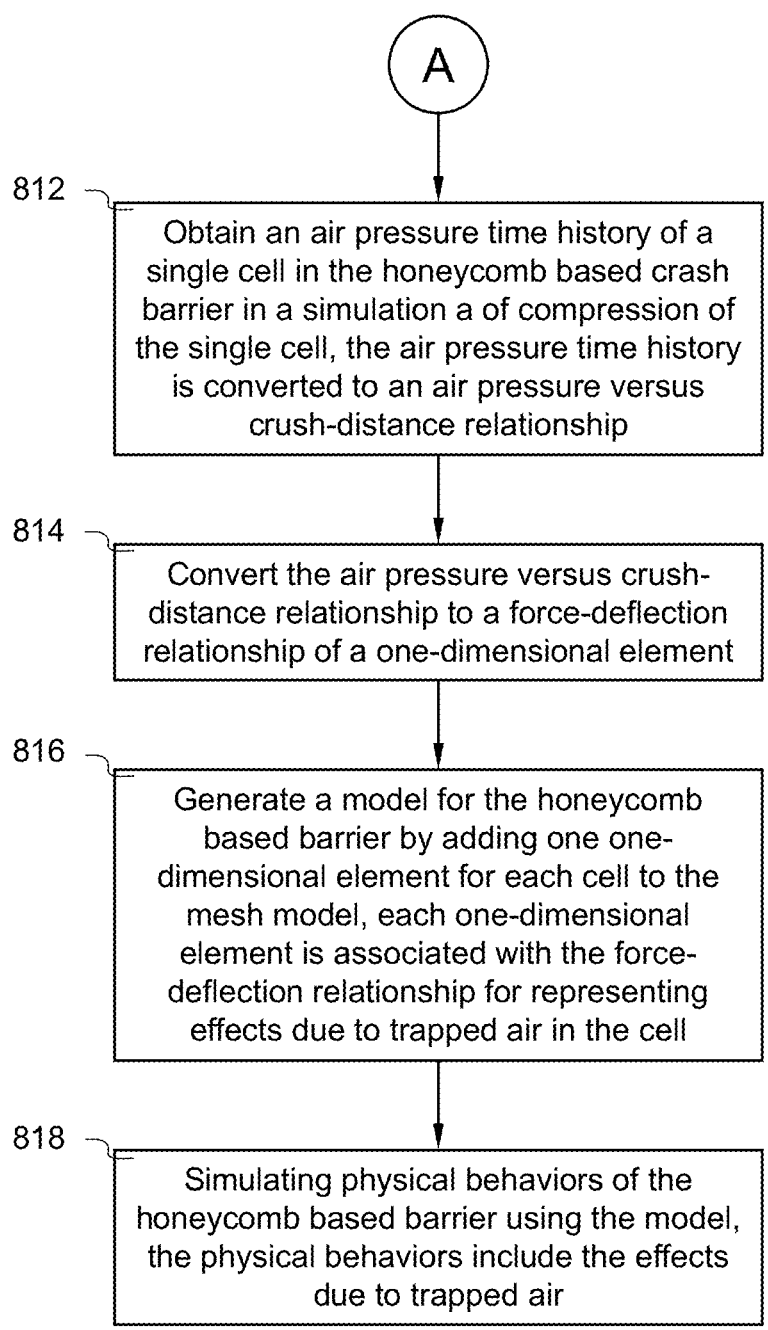

FIGS. 8A-8B collectively is a flowchart illustrating an example process 800 of modeling trapped air in a honeycomb based crash barrier. Process 800 starts by receiving a specification of a honeycomb based crash barrier in a computer system (e.g., computer systems 900, 920 in FIGS. 9A-9B) at action 802. The specification can include the structure of multiple cells in the honeycomb based crash barrier. The specification can also include a physical static crush strength. The specification may be issued by suppliers of honeycomb based crash barriers. The physical static crush strength is a target value for a computer-aided engineering (CAE) mesh model to match. At action 804, a computer-aided engineering (CAE) mesh model is created for representing the structure of multiple cells in the honeycomb based crash barrier. Shell finite elements can be used for such a mesh model. An example CAE mesh model is based on finite element analysis model.

At action 806, a numerical static strength is obtained in a static crush simulation using the CAE mesh model. Next, at decision 808, it is determined whether the numerical result (i.e., numerical static strength) matches the target value (i.e., the specified physical static strength). If not, process 800 follows the 'no' branch to action 810, in which parameters of the CAE mesh model are adjusted. Example parameters include thickness or material properties of the shell finite elements. Process 800 loops back to action 806 to repeat the static crush simulation with the adjusted mesh model.

When decision 808 becomes true, it means that the mesh model has been adjusted to represent the static strength of the honeycomb based crash barrier. There are many known methods to compare values, for example, two numbers within a predetermined tolerance.

Figure 5D:
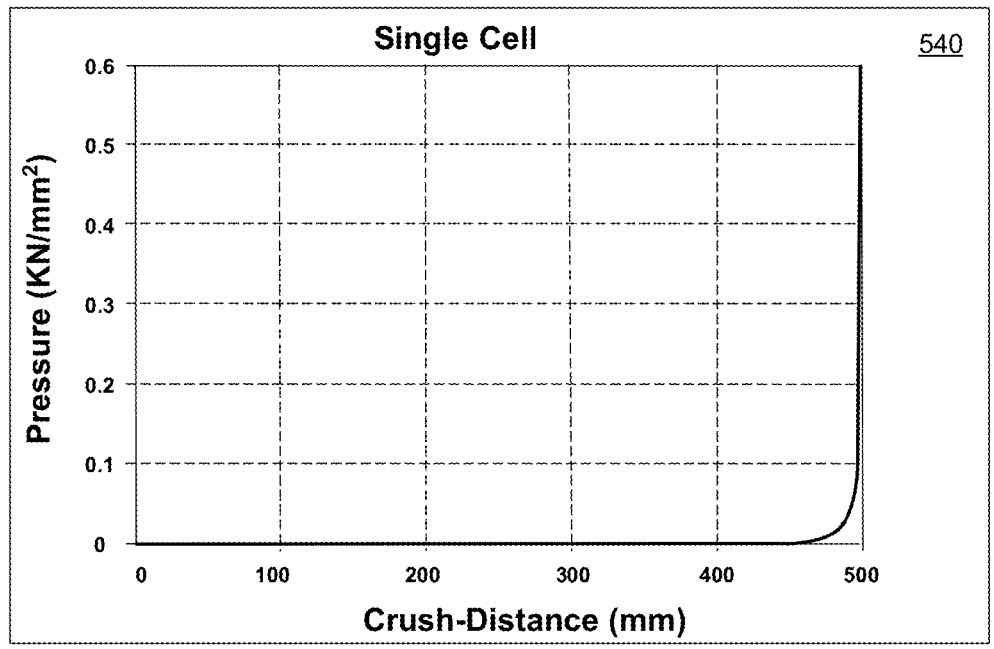
FIG. 5D is a diagram showing an example air pressure versus crush-distance relationship in a single cell.
Figure 5E:
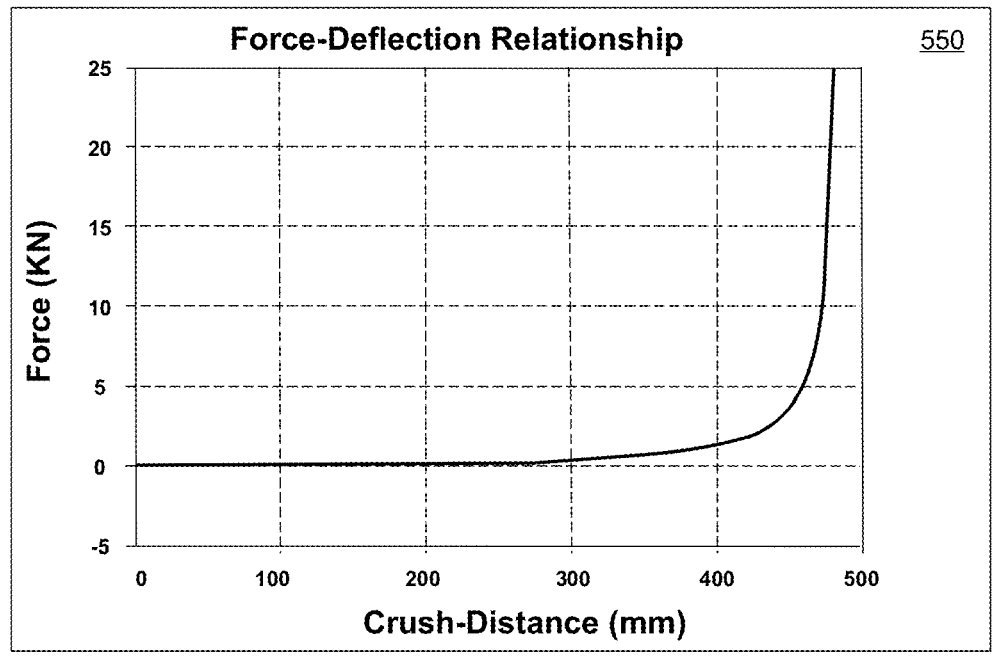
FIG. 5E is a diagram showing an example force-deflection relationship for a one-dimensional element.

After decision 808 is determined to be true, process 800 follows the 'yes' branch to action 812. A pressure time history of the trapped air in a single cell (FIG. 5C) is determined in a simulation of a compression of the single cell. The pressure time history can be converted to an pressure versus crush-distance relationship (FIG. 5D). In one embodiment, a simulation is conducted using an airbag model based on control volume, for example, airbag model 500 shown in FIGS. 5A-5B.

At action 814, the pressure versus crush-distance curve is converted to a force-deflection relationship, which is associated with a one-dimensional element or a compressible element. In other words, the one-dimensional element acts like the trapped air in a single cell, when specified with the force-deflection relationship. A model for the honeycomb based barrier can then be generated by adding one compressible element for each cell in the mesh model (e.g., mesh model 400 shown in FIG. 4) at action 816. Each one-dimensional element is specified with the force-deflection relationship. Finally, at action 818, physical behaviors including the effects due to the trapped air can be obtained in a simulation using the model (e.g., model 600 shown in FIG. 6) for the honeycomb based crash barrier.

An alternative example process 830 for modeling trapped air in a honeycomb based crash barrier is shown in FIG. 8C. Process 830 starts at action 832 by receiving a specification of a honeycomb based crash barrier in a computer system (e.g., computer systems 900, 920 in FIGS. 9A-9B). The crash barrier contains at least a cell (i.e., one of the multiple cells). The cell contains trapped air.

At action 834, a model (e.g., finite element analysis model) is generated to represent the honeycomb based crash barrier according to the specification. In one embodiment, the mesh model contains two-dimensional shell finite elements for representing strength of the crash barrier. The model further includes a compressible element to represent the trapped air in the cell. The compressible element is characterized by a force-deflection relationship between air pressure in the cell and a crush-distance a compression of the cell. The compressible element can be a one-dimensional finite element, for example, a discrete beam element. The corresponding force-deflection relationship is the axial force versus the deflection in the longitudinal axis of the compressible element. The axial force is derived from the air pressure in response to the compression of the cell. The deflection is the crush-distance due to the compression of the cell.

The compression of the cell to determine the force-deflection relationship can be obtained in a simulation using an airbag model. The airbag model contains the same shape of the single cell (i.e., an elongated member with a first end and a second end along the longitudinal axis of the cell). The airbag model has the same hexagonal cross-section area of the elongated member. The control volume contains a moving boundary corresponding to the first end of the cell and a fixed boundary corresponding to the second end of the cell. The airbag model is compressed/pushed/crushed from the moving boundary towards the fixed boundary along the longitudinal axis of the cell. The distance of the moving boundary has moved is the crush-distance of the cell in the simulation. The airbag model maintains a constant hexagonal cross-section area of the cell throughout the simulation. The airbag model shrinks as the crush-distance increases in the simulation. Air pressure in the airbag model is calculated based on Gamma law.

At action 838, physical behaviors of the honeycomb based crash barrier are simulated using the model. The physical behaviors include numerical behaviors of the trapped air based on the force-deflection relationship.

The subject matter described herein may be implemented using any suitable processing system with any suitable combination of hardware, software and/or firmware, such as described below with reference to the non-limiting examples shown in FIGS. 9A-9C.

Figure 9A:
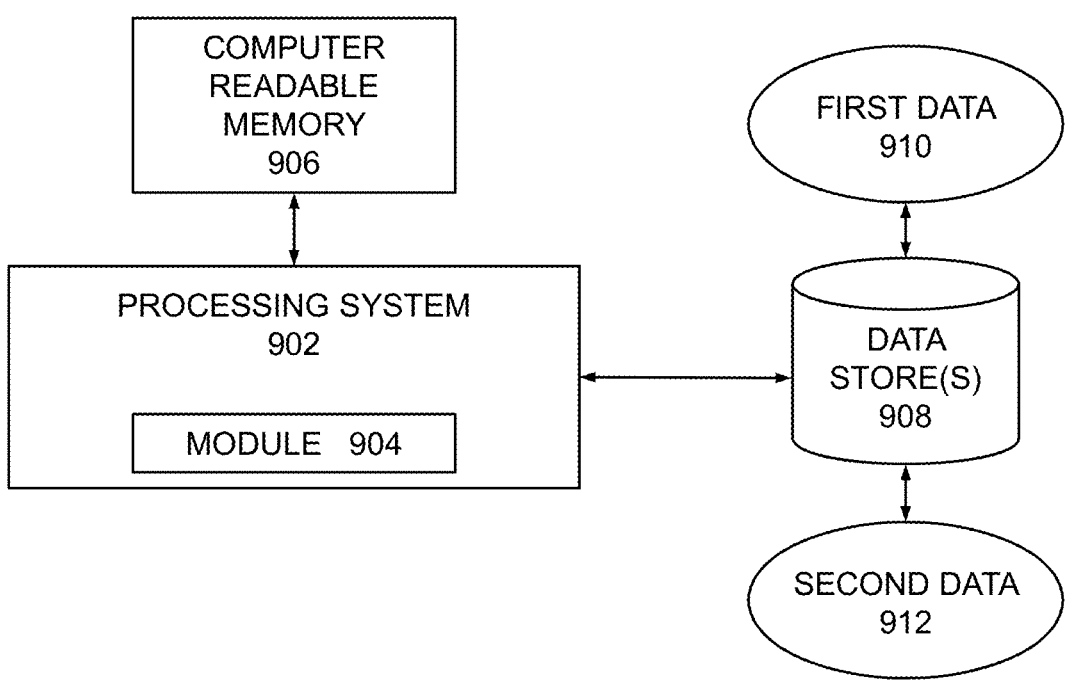
FIG. 9A is a block diagram showing an example system including a standalone computing architecture.

FIG. 9A depicts an example system 900 that includes a standalone computer architecture where a processing system 902 (e.g., one or more computer processors) includes a module 904 (e.g., software module stored in memory) being executed on it. The processing system 902 has access to a non-transitory computer-readable memory 906 in addition to one or more data stores 908. The one or more data stores 908 may contain first data 910 as well as second data 912.

Figure 9B:
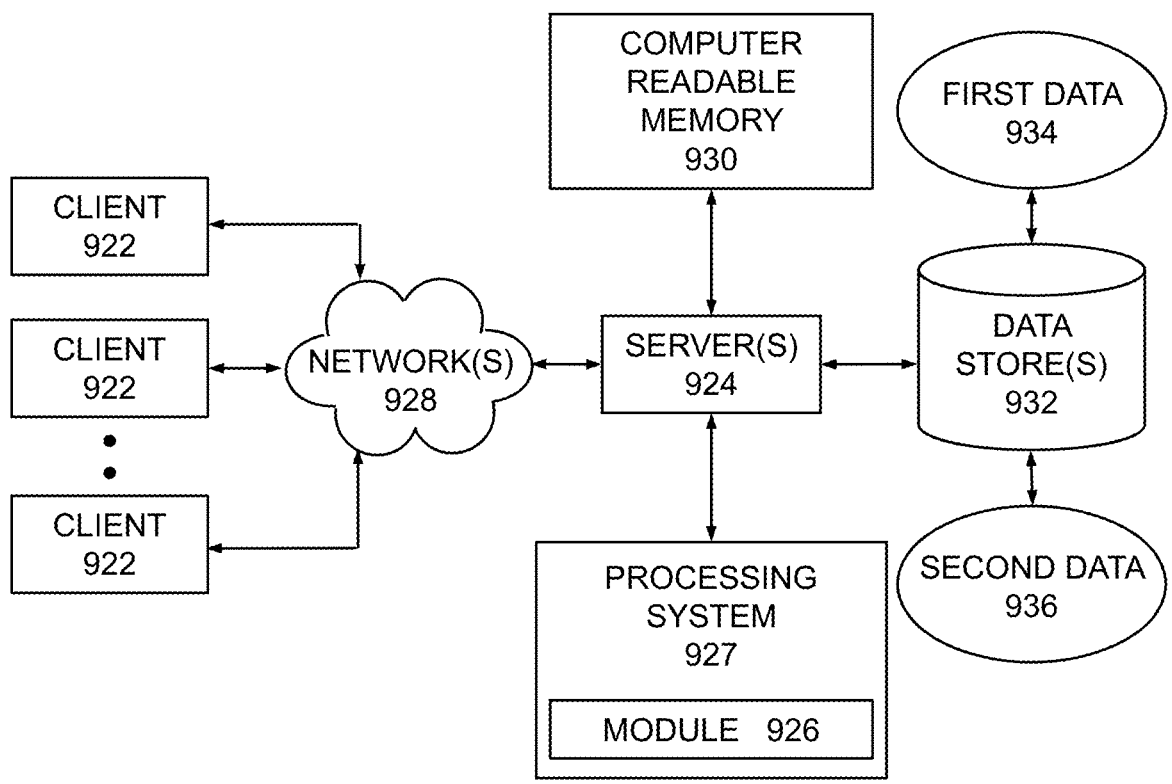
FIG. 9B is a block diagram showing an example system including a client-server computing architecture.

FIG. 9B depicts another example system 920 that includes a client-server architecture. One or more clients 922 (e.g., user personal computer, workstation, etc.) accesses one or more servers 924 executing computer instructions of a module 926 (e.g., software module stored in memory) on a processing system 927 via one or more networks 928. The one or more servers 924 may access a non-transitory computer readable memory 930 as well as one or more data stores 932. The one or more data stores 932 may contain first data 934 as well as second data 936.

Figure 9C:
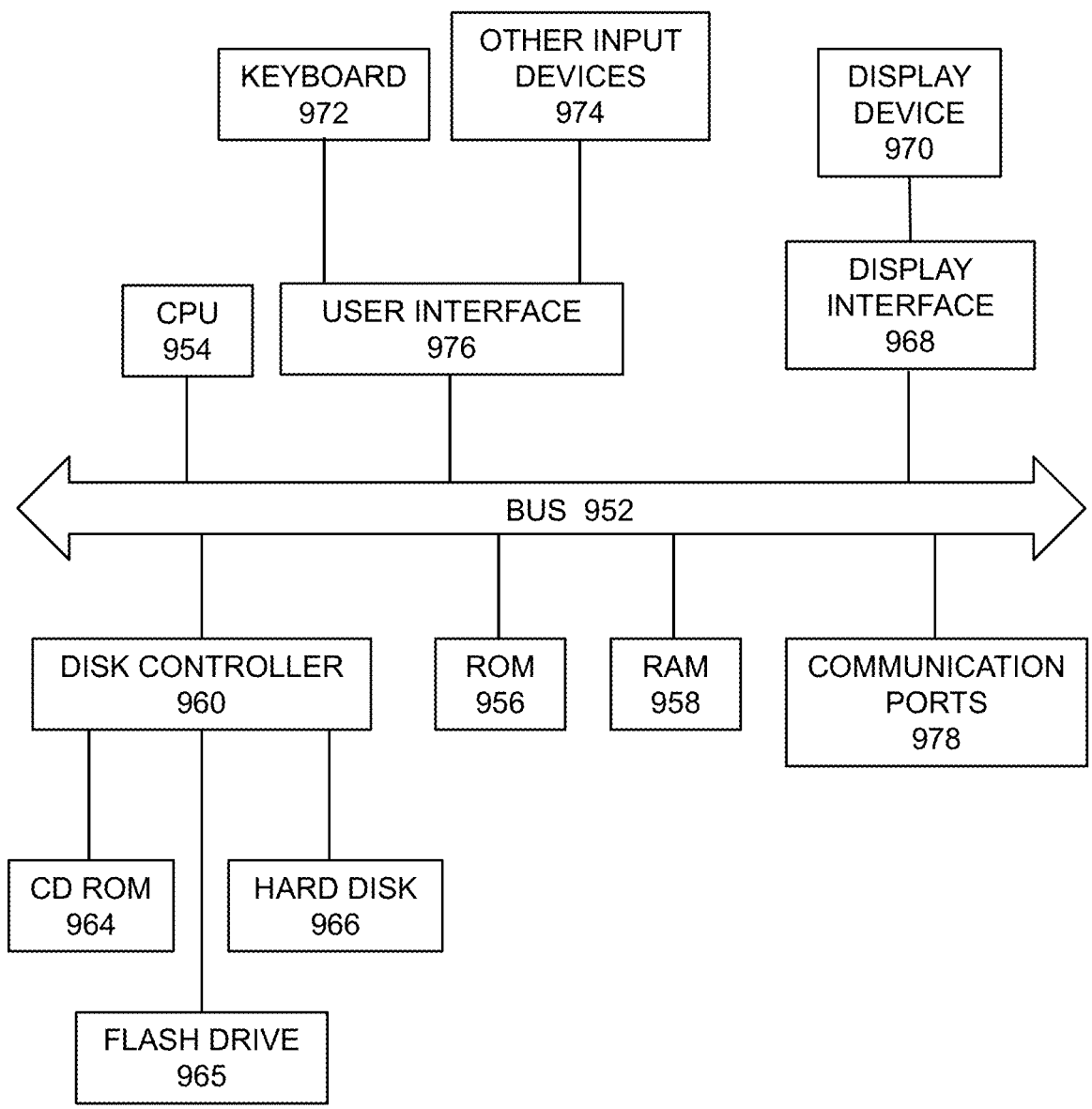
FIG. 9C is a function block diagram showing salient components of an example computing device for implementing the subject matters described herein.

FIG. 9C shows a function block diagram of example hardware for a standalone computer architecture 950, such as the architecture depicted in FIG. 9A, that may be used to contain and/or implement the subject matter described herein. A bus 952 may serve as the information highway interconnecting the other illustrated components of the hardware. A processing system 954 labeled CPU (central processing unit) (e.g., one or more computer processors), may perform calculations and logic operations required to execute a program/software/module. A non-transitory computer-readable storage medium, such as read only memory (ROM) 956 and random access memory (RAM) 958, may be in communication with the processing system 954 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium thru communication port 978.

A disk controller 960 interfaces one or more optional disk drives to the system bus 952. These disk drives may be external or internal flash memory drives 965, external or internal CD-ROM, CD-R, CD-RW or DVD drives 964, or external or internal hard disk drives 966. As indicated previously, these various disk drives and disk controllers are optional devices.

If needed, the processor 954 may access each of the following components: real-time data buffer, conveyors, file input processor, database index shared access memory loader, reference data buffer and data managers. Each component may include a software application stored in one or more of the disk drives connected to the disk controller 960, the ROM 956 and/or the RAM 958.

A display interface 968 may permit information from the bus 952 to be displayed on a display 970 in audio, video, graphical, text, or alphanumeric format.

In addition to the standard computer-type components, the hardware may also include data input devices, such as a keyboard 972, or other input device 974, such as a microphone, remote control, pointer, mouse, touch screen, and/or joystick.

This written description describes example embodiments of the subject matter, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Additionally, used herein, the terms "longitudinal", and "horizontal" are intended to provide relative positions/locations for the purposes of description, and are not intended to designate an absolute frame of reference. Further, the order of blocks in process flowcharts or diagrams do not inherently indicate any particular order nor imply any limitations.

Although the subject matter has been described with reference to specific embodiments thereof, these embodiments are merely illustrative, and not restrictive of, the invention. Various modifications or changes to the specifically disclosed example embodiments will be suggested to persons skilled in the art. Whereas the direction of the longitudinal axis of a single cell is defined from the first end 502*a* to the second end 502*b*, it can also be defined differently to accomplish the same, for example, from the second end 502*b* to the first end 502*a*. In summary, the scope of the subject matter should not be restricted to the specific example embodiments disclosed herein, and all modifications that are readily suggested to those of ordinary skill in the art should be included within the spirit and purview of this application and scope of the appended claims.

What is claimed is:

1. A computer-implemented method comprising:
receiving a specification of a honeycomb based crash barrier including a plurality of cells with each of the plurality of cells containing trapped air;
generating a finite element analysis model representing the honeycomb based crash barrier using two-dimensional finite elements to represent the plurality of cells;
determining an air pressure of the trapped air versus crush-distance relationship for a cell of the plurality of cells based on a simulation of compressing the cell along a longitudinal axis of the cell according to a formulation characterizing a pressure, a density, and an internal energy of the trapped air;
transforming the air pressure of the trapped air versus crush-distance relationship for the cell into a force-deflection relationship for one-dimensional finite elements;
modifying the finite element analysis model to produce a modified model, the modified model including a compressible element for each of the plurality of cells, wherein each of the compressible elements comprise a one-dimensional finite element that behaves according to the force-deflection relationship;
simulating physical behaviors of the honeycomb based crash barrier using the modified model, the physical behaviors including numerical behaviors of the trapped air based on the force-deflection relationship and the one-dimensional finite elements; and
determining survivability of a human occupant in an automobile due to an impact event between the automobile and the honeycomb based crash barrier based on the simulated physical behaviors.

2. The method of claim 1, wherein the cell comprises an elongated member having a first end and a second end along the longitudinal axis, wherein the elongated member has a hexagonal cross-section area perpendicular to the longitudinal axis.

3. The method of claim 1, wherein the modified model includes a representation of the force-deflection relationship, wherein the crush-distance corresponds to an amount of compression of the compressible element, and wherein the air pressure corresponds to a compression force of the compressible element corresponding to the amount of compression.

4. The method of claim 3, wherein an amount of compression of the cell corresponds to the amount of compression of the compressible element.

5. The method of claim 4, wherein the cell is formed by eight two-dimensional surfaces including two ends and six sides, and wherein the trapped air is enclosed within the eight surfaces.

6. The method of claim 1, wherein the formulation is governed by a Gamma law.

7. The method of claim 1 wherein a relative change of the internal energy of the trapped air is related to a relative change of a volume of the trapped air, and wherein a change of the volume of the trapped air corresponds to the amount of the compression of the cell.

8. The method of claim 7, wherein cross-sections of the cell perpendicular to the longitudinal axis are maintained uniformly shaped in the simulation of the compressing of the cell.

9. The method of claim 7, wherein the pressure of the trapped air increases nonlinearly with the amount of the compression of the cell according to the related relative changes of the internal energy and the volume of the trapped air in the simulation of the compressing of the cell.

10. The method of claim 3, wherein the representation includes a lookup table describing the force-deflection relationship.

11. The method of claim 3, wherein the compressible element corresponds to a discrete beam element for representing the trapped air with numerical behaviors based on the force-deflection relationship.

12. The method of claim 1, wherein the specification includes a structure and a corresponding static crush strength of the honeycomb based crash barrier, wherein the structure is represented by a mesh model.

13. A system comprising:
a memory storing instructions;
one or more processors coupled to the memory, the one or more processors
executing the instructions from the memory to perform a method comprises:
receiving a specification of a honeycomb based crash barrier including a plurality of cells with each of the plurality of cells containing trapped air;
generating a finite element analysis model representing the honeycomb based crash barrier using two-dimensional finite elements to represent the plurality of cells;
determining an air pressure of the trapped air versus crush-distance relationship for a cell of the plurality of cells based on a simulation of compressing the cell along a longitudinal axis of the cell according to a formulation characterizing a pressure, a density, and an internal energy of the trapped air;
transforming the air pressure of the trapped air versus crush-distance relationship for the cell into a force-deflection relationship for one-dimensional finite elements;
modifying the finite element analysis model to produce a modified model, the modified model including a compressible element for each of the plurality of cells, wherein each of the compressible elements comprise a one-dimensional finite element that behaves according to the force-deflection relationship;
simulating physical behaviors of the honeycomb based crash barrier using the modified model, the physical behaviors including numerical behaviors of the trapped air based on the force-deflection relationship and the one-dimensional finite elements; and
determining survivability of a human occupant in an automobile due to an impact event between the automobile and the honeycomb based crash barrier based on the simulated physical behaviors.

14. A non-transitory computer-readable medium storing instructions for commanding one or more processors to perform a method comprising:
receiving a specification of a honeycomb based crash barrier including a plurality of cells with each of the plurality of cells containing trapped air;

generating a finite element analysis model representing the honeycomb based crash barrier using two-dimensional finite elements to represent the plurality of cells;

determining an air pressure of the trapped air versus crush-distance relationship for a cell of the plurality of cells based on a simulation of compressing the cell along a longitudinal axis of the cell according to a formulation characterizing a pressure, a density, and an internal energy of the trapped air;

transforming the air pressure of the trapped air versus crush-distance relationship for the cell into a force-deflection relationship for one-dimensional finite elements;

modifying the finite element analysis model to produce a modified model, the modified model including a compressible element for each of the plurality of cells, wherein each of the compressible elements comprise a one-dimensional finite element that behaves according to the force-deflection relationship;

simulating physical behaviors of the honeycomb based crash barrier using the modified model, the physical behaviors including numerical behaviors of the trapped air based on the force-deflection relationship and the one-dimensional finite elements; and determining survivability of a human occupant in an automobile due to an impact event between the automobile and the honeycomb based crash barrier based on the simulated physical behaviors.

15. The method of claim 2, wherein the first end and the second end are located at either end of the elongated member.

16. The method of claim 15, wherein the first end is a moving boundary and the second end is a fixed boundary.

17. The method of claim 2, wherein the longitudinal axis has a direction defined as a compression or crush direction from the first end to the second end.

18. The method of claim 1, wherein the two-dimensional finite elements representing the plurality of cells comprise two-dimensional shell finite elements.

19. The method of claim 1, wherein the finite element analysis model comprises an adjusted finite element analysis model and generation of the adjusted model comprises:

generating an initial finite element analysis model representing the honeycomb based crash barrier using an initial set of two-dimensional finite elements to represent the plurality of cells;

obtaining an initial numerical static strength using the initial finite element analysis model in a first static crash simulation;

determining the initial numerical static strength fails to satisfy a physical static crush strength included in the specification of the honeycomb based crash barrier;

adjusting, in response to the numerical static strength failing to satisfy the physical static crush strength, one or more properties of the initial set of two-dimensional finite elements to produce the adjusted model with an adjusted set of two-dimensional finite elements to represent the plurality of cells;

obtaining an adjusted numerical static strength using the adjusted finite element analysis model in a second static crash simulation; and determining the adjusted numerical static strength satisfies the physical static crush strength included in the specification of the honeycomb based crash barrier.

* * * * *